US008884855B2

(12) United States Patent
Boom et al.

(10) Patent No.: US 8,884,855 B2
(45) Date of Patent: *Nov. 11, 2014

(54) DRIVING OF ELECTRO-OPTIC DISPLAYS

(71) Applicant: Liquavista B.V., Eindhoven (NL)

(72) Inventors: Robert Gerardus Hendrik Boom, Venlo (NL); Roy Van Dijk, Eindhoven (NL); Henricus Petronella Maria Derckx, Wert (NL)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/967,520

(22) Filed: Aug. 15, 2013

(65) Prior Publication Data

US 2013/0328856 A1   Dec. 12, 2013

Related U.S. Application Data

(63) Continuation of application No. 12/515,114, filed as application No. PCT/EP2007/062427 on Nov. 15, 2007, now Pat. No. 8,542,172.

(30) Foreign Application Priority Data

Nov. 16, 2006   (GB) .................................. 0622899.3
Mar. 30, 2007   (GB) .................................. 0706278.9

(51) Int. Cl.
G09G 3/34        (2006.01)
G02B 26/00       (2006.01)
G02F 1/167       (2006.01)

(52) U.S. Cl.
CPC .......... *G09G 3/34* (2013.01); *G09G 2310/0256* (2013.01); *G09G 3/344* (2013.01); *G02F 2001/1676* (2013.01); *G02B 26/004* (2013.01)
USPC ............... 345/84; 345/94; 345/107; 345/211; 359/296

(58) Field of Classification Search
USPC ................. 345/84–87, 94–97, 107, 211–213; 359/296
See application file for complete search history.

(56) References Cited

U.S. PATENT DOCUMENTS 4,041,481 A * 8/1977 Sato .............................. 345/107
4,187,160 A * 2/1980 Zimmermann ............... 359/296
6,115,083 A    9/2000 Doherty et al.
6,501,226 B2  12/2002 Lai et al.

(Continued)

FOREIGN PATENT DOCUMENTS

EP       1345203 A1     3/2003
TW     2004025038 A    11/2004

(Continued)

OTHER PUBLICATIONS

International Search Report dated Mar. 6, 2008 from Application No. PCT/EP2007/062427, International Filing Date: Nov. 15, 2007.

(Continued)

Primary Examiner — Gregory J Tryder
(74) Attorney, Agent, or Firm — BainwoodHuang

(57) ABSTRACT

A display apparatus includes a display device and a display driving system having a data input connected to a distributor for providing signals for driving image regions. Each image region has an active display state in which it is driven with an active voltage signal including a first signal level which sets the image region to the active display state and a second signal level applied for a shorter duration than the first signal level. Operation includes (1) applying the first signal level to an image region in response to receiving data on the data input indicating that the image region is to be set to the active display state, (2) applying the second signal level to the image region after said first signal level has been applied, and (3) reapplying the first signal level before receipt of further data for said image region on the data input.

24 Claims, 6 Drawing Sheets

(56) References Cited

U.S. PATENT DOCUMENTS

| | | |
|---|---|---|
| 6,603,444 B1 | 8/2003 | Kawanami et al. |
| 6,934,316 B2 | 8/2005 | Cornwall et al. |
| 7,170,485 B2 | 1/2007 | Huang |
| 8,154,486 B2 | 4/2012 | Feenstra et al. |
| 2003/0090452 A1 | 5/2003 | Uchino et al. |
| 2004/0051688 A1 | 3/2004 | Orii et al. |
| 2006/0262083 A1* | 11/2006 | Zhou et al. .................... 345/107 |
| 2007/0052648 A1* | 3/2007 | Zhou et al. ...................... 345/94 |
| 2007/0052667 A1* | 3/2007 | Zhou et al. .................... 345/107 |
| 2007/0075941 A1* | 4/2007 | Zhou et al. ...................... 345/84 |
| 2007/0075963 A1* | 4/2007 | Zhou et al. .................... 345/107 |
| 2007/0205978 A1* | 9/2007 | Zhou et al. .................... 345/107 |
| 2008/0224989 A1* | 9/2008 | Zhou et al. .................... 345/107 |
| 2008/0278434 A1* | 11/2008 | Van Dijk et al. ............. 345/107 |
| 2010/0079434 A1 | 4/2010 | Boom et al. |

FOREIGN PATENT DOCUMENTS

| | | |
|---|---|---|
| TW | 2006017833 A | 6/2006 |
| WO | 03/071346 A1 | 8/2003 |
| WO | 03/075086 A2 | 9/2003 |
| WO | 03/079323 A1 | 9/2003 |
| WO | 2005024770 A1 | 3/2005 |
| WO | 2005/036517 A1 | 4/2005 |
| WO | 2005/098797 A2 | 10/2005 |
| WO | 2006/054229 A1 | 5/2006 |
| WO | 2007/049196 A2 | 5/2007 |
| WO | 2007/057797 A1 | 5/2007 |

OTHER PUBLICATIONS

Written Opinion dated Mar. 6, 2008 from Application No. PCT/EP2007/062427, International Filing Date: Nov. 15, 2007.

United Kingdom Search Report dated Jul. 24, 2007 from Application No. GB 0706278.9.

Translation of Search Report in Taiwanese Counterpart Application No. 096143335, Search completed on Jul. 18, 2013.

* cited by examiner

DRIVING OF ELECTRO-OPTIC DISPLAYS

REFERENCE TO RELATED APPLICATIONS

This application claims the benefit under 35 U.S.C. §120 of U.S. application Ser. No. 12/515,114 having a filing date under 35 U.S.C. §371(c) of Oct. 8, 2009, which is the US national phase of PCT/EP07/062427 filed Nov. 11, 2007. This application also claims the benefit under 35 U.S.C. §119 of GB Applications 0622899.3 filed Nov. 16, 2006 and 0706278.9 filed Mar. 30, 2007.

FIELD OF THE INVENTION

This invention relates to a method of driving of electro-optic display devices, and electro-optic display apparatus.

BACKGROUND OF THE INVENTION

Various different types of electro-optic display devices are known, including liquid crystal display devices, electrophoretic display devices, electrochromic display devices, etc. A recently developed type of electro-optic display device is an electrowetting display device, as described amongst others in international patent applications WO 2003/071346 and WO 2005/098797.

International patent application WO 2005/036517 describes an electrowetting display apparatus having an active matrix display device, in which reset pulses are applied to image regions in order to improve the quality of the display. The pulses in this disclosure are also called preset pulses, because they are applied prior to the voltage setting an image region in a display state. In the case of segmented electrodes, preset pulses may also be applied when driving the electrowetting elements of the display device.

It has been found to be desirable to apply reset pulses also during the time an image region has a certain display state. Without the application of reset pulses, the electrowetting elements which are switched to an open state may become less effective at maintaining their display state. Such reset pulses can be applied advantageously for both active matrix display devices, segmented electrowetting display devices which have a direct drive scheme and passive matrix display devices.

For explanatory purposes, a prior art display driving system which could be suitable for applying a reset pulse scheme is illustrated in FIGS. 9 to 12. Referring to FIG. 9, in the prior art arrangement, the display driving system receives data from a microcontroller. In some embodiments, the microcontroller might be physically incorporated within the total display driving hardware. An input data interface provides data to a display controller 4 which in turn drives an output latch 6. Each of the segments of the display device is driven by a driver stage 8.

FIG. 10 illustrates the circuitry in a driver stage according to the prior art. The voltage applied across the electrowetting element Vew is generated by switching between a high voltage level Vout and ground. This is done by selectively actuating switches S1 and S2, implemented as transistors. In order to apply reset pulses, which may be of a form similar to that shown in FIG. 11, a switching scheme similar to that shown in FIG. 12 is used. A problem with this prior art arrangement is that, if a reset pulse is applied frequently and with short duration, the input data rate is relatively high. When a microcontroller supplies the input data, it must run at a relatively high frequency to deliver the input data, which may require a high power consumption. The same applies to the output latch.

It would be desirable to provide arrangements whereby it is possible to reduce the number of switching actions of the controller circuitry when applying a reset pulse scheme for an electro-optic display device, in particular, but not exclusively, an electrowetting display device.

SUMMARY OF THE INVENTION

In accordance with one aspect of the present invention, there is provided a method of operating an electro-optic display apparatus, the display apparatus including a display device having image regions and a display driving system, the driving system having a distributor for providing signals for driving the image regions, and a data input for selecting image regions connected to the input of the distributor, each image region having an active display state in which the image region is driven with an active voltage signal, wherein the active voltage signal includes a first signal level which sets an image region to the active display state and a second signal level different from said first signal level and which is applied for a shorter duration than said first signal level, the method comprising:

applying said first signal level to one of said image regions in response to receiving data on said data input indicating that said image region is to be set to the active display state, applying the second signal level to said image region after said first signal level has been applied; and reapplying said first signal level before receipt of further data for said image region on said data input.

The distributor has as input the data input. The distributor has a plurality of distributor outputs, each of which either on its own or in combination corresponds to a specific image region. The term 'data' refers to image information indicating an active or inactive state for a specific image region. Image data does not include signals relating to the timing and the level of the second signal level. On receipt of data on its input, the distributor provides at the distributor output(s) for the image region corresponding to the data one or more signals for setting the image region in the active state.

Thus with embodiments of the invention, reapplication of the first signal level, once the application of the second signal level is completed, does not require the receipt of additional data signals from the data input. Instead, once the second signal has been applied, original data settings are maintained. This therefore avoids the need for the reading of input data every time a second signal level is applied, thereby enabling a lower input data rate.

The second signal level and the duration of its application are preferably selected such to allow the image region to maintain substantially its active display state while the second signal level is applied In an embodiment of the method said first signal level is substantially different from zero, and said second signal level is substantially equal to zero. The first signal level may be larger than 10 V, the second signal level may be less than 5 V or less than ⅓ of the first signal level.

In a display device in which a plurality of image regions have a common signal line, the method preferably comprises changing the voltage on the common signal line, thereby changing the active voltage signal of the image region from the first signal level to the second signal level and back to the first signal level. The control of the voltage on the common signal line allows the application of the second signal level simultaneously to a plurality of regions.

In a driving assembly that includes a driver stage for each image region and one or more driver stages have a power supply input, the method preferably includes changing a voltage of a power applied to the power supply input in response to a reset signal, thereby changing the active voltage signal of the one or more driver stages from the first signal level to the second signal level and back to the first signal level. The control of the power supply to the driver stages allows control of the voltage on the image regions without requiring further data from the data input.

The second signal level need not be applied to all segments simultaneously, but can be distributed in time over the segments or groups of segments. Such distributed application reduces the instantaneous power requirements of the drive and gives less interference. The distribution requires a more elaborate control of the second voltage.

The display driving system for an electro-optic display device having image regions, each image region having an active display state in which the image region is driven with an active voltage signal, including a data input for selecting image regions; the display driving system includes a distributor having an input connected to the data input and having one or more distributor outputs;

a driving assembly including one or more driver stages, each driver stage having an input connected to one of the distributor outputs and a driver stage output connected to one of said image regions for providing an active voltage signal, the active voltage signal including a first signal level for setting the image region to an active display state and a second signal level different from said first signal level and which is applied for shorter durations than said first signal level; and a reset controller having an output providing a reset signal and connected to the driving assembly for providing in response to the reset signal at the one or more driver stage outputs the second signal level of the active voltage signal.

The driving assembly may independently be characterized by the presence of one or more inputs for image data and one or more separate inputs for one or more reset signals. Since the reset signal is applied directly to the driver stages, bypassing the distributor and the following latch that process the input data, the distributor and latch need not process the reset signal as well and can operate at a lower clock frequency, thereby reducing power consumption.

When the driving assembly includes one driving stage, the distributor of the display driving system coincides with a latch arranged before the driving assembly and has one output.

A third aspect of the invention relates to an electro-optic display apparatus including a display driving system according to the invention and a display device.

Features and advantages of the invention will become apparent from the following description of preferred embodiments of the invention, given by way of example only, which is made with reference to the accompanying drawings.

DETAILED DESCRIPTION OF THE INVENTION

The contents of the following patent applications are hereby incorporated by reference:
U.S. Ser. No. 12/515,114
PCT/EP07/062427
GB 0622899.3
GB 0706278.9

Figure 1:
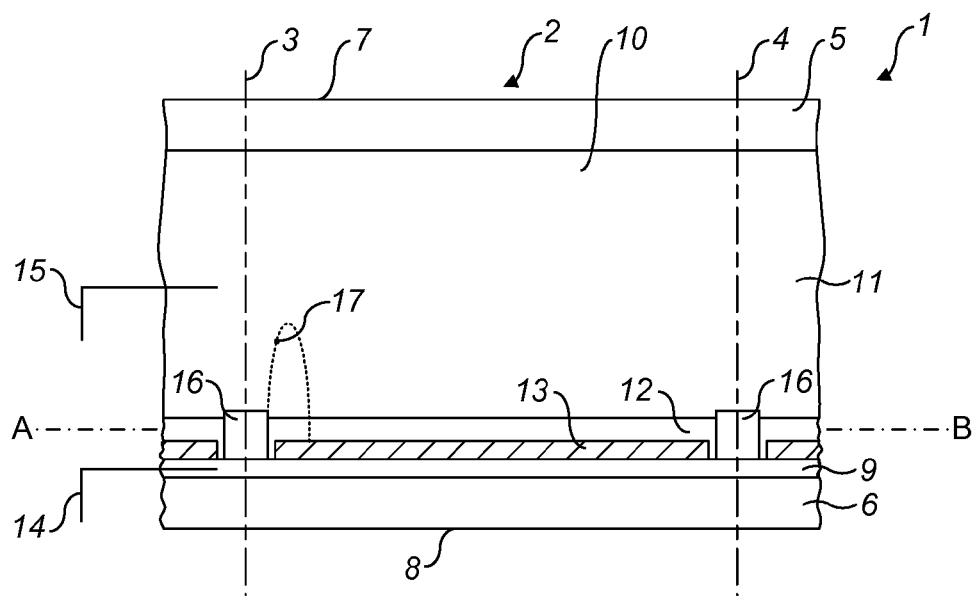
FIG. 1 shows a diagrammatic cross-section of a part of an embodiment of electro-optic display device according to the invention.

FIG. 1 shows a diagrammatic cross-section of an embodiment of an electrowetting display device 1 according to the invention. The display device includes a plurality of electrowetting elements 2, one of which is shown in the Figure. The lateral extent of the element is indicated in the Figure by the two dashed lines 3, 4. The electrowetting elements comprise a first support plate 5 and a second support plate 6. The support plates may be separate parts of each electrowetting element, but the support plates are preferably shared in common by the plurality of electrowetting elements. The support plates may be made for instance of glass or polymer and may be rigid or flexible.

The display device has a viewing side 7 on which an image or display formed by the display device can be viewed and a rear side 8. The first support plate 5 faces the viewing side; the second support plate 6 faces the rear side 8. In an alternative embodiment the display may be viewed from the rear side 8. The display device may be of the reflective, transmissive or transflective type. The display is, in the embodiment shown, a segmented display type in which the image is built up of segments. The segments can be switched simultaneously or separately. Each segment includes one electrowetting element 2 or a number of electrowetting elements 2 that may be neighbouring or distant. The electrowetting elements included in one segment are switched simultaneously.

A space 10 between the support plates is filled with two fluids: a first fluid 12 and a second fluid 11. The first fluid is immiscible with the second fluid. The second fluid is electrically conductive or polar, and may be water or a salt solution such as a solution of potassium chloride in a mixture of water and ethyl alcohol. The second fluid is preferably transparent, but may be coloured, white, absorbing or reflecting. The first fluid is electrically non-conductive and may for instance be an alkane like hexadecane or (silicone) oil. A hydrophobic layer 13 is arranged on the support plate 6, creating an electrowetting surface area facing the space 10. The layer may be an uninterrupted layer extending over a plurality of electrowetting elements 2 or it may be an interrupted layer, each part extending only over one electrowetting element 2. The layer may be for instance an amorphous fluoropolymer layer such as AF1600 or another low surface energy polymer. The hydrophobic character causes the first fluid to adhere preferentially to the support plate 6 since the first fluid has a higher wettability with respect to the surface of the hydrophobic layer 13 than it has with respect to the second fluid. Wettability relates to the relative affinity of a fluid for the surface of a solid. Wettability increases with increasing affinity, and it can be measured by the contact angle formed between the fluid and the solid and measured internal to the fluid of interest. This increases from relative non-wettability at an angle more than 90° to complete wettability when the contact angle is 0°, in which case the fluid tends to form a film on the surface of the solid.

Each segment is defined by a segment electrode 9 arranged on the second support plate 6. The segment electrode 9 is separated from the fluids by an insulator, which may be the hydrophobic layer 13. In general, the segment electrode 9 will be one of a number of separate electrodes arranged separately on the second support plate 6, each of which can be of any desired shape or form. Each segment electrode will define an image region which overlaps one or more electrowetting elements, which will all be switched simultaneously by at least the segment electrode. The segment electrode 9 is supplied with voltage signals by a signal line 14. When a segment covers several electrowetting elements, the signal line 14 is a common signal line for the electrowetting elements. A second signal line 15 is connected to an electrode which is in contact with the conductive second fluid 11. This electrode is common to all segments, since they are fluidly interconnected by and share the second fluid, uninterrupted by walls. The segment electrodes 9 on the support plate 6 each are connected to driving circuitry on the support plate by a matrix of printed wiring.

The lateral extent of the first fluid 12 is constrained to one electrowetting element by walls 16 that follow the cross-section of the electrowetting element in the plane A-B. The wiring of the display device of FIG. 1 is arranged between the walls 16 and the support plate 6. Further details of the electrowetting elements of the display are disclosed amongst others in international patent application WO 03071346.

The first fluid absorbs at least a part of the optical spectrum. The fluid may be transmissive for a part of the optical spectrum, forming a colour filter. For this purpose the fluid may be coloured by addition of pigment particles or dye. Alternatively, the first fluid may be black, i.e. absorb substantially all parts of the optical spectrum, or reflecting. The hydrophobic layer may be transparent or reflective. A reflective layer may reflect the entire visible spectrum, making the layer appear white, or part of it, making it have a relatively light colour.

When an active voltage of a non-zero first signal level is applied between the signal lines 14 and 15, electrostatic forces will move the second fluid 11 towards the segment electrode 9, thereby repelling the first fluid 12 from the area of the hydrophobic layer 13 to the walls 16 surrounding the area of the hydrophobic layer, to a drop-like form as schematically indicated by a dashed line 17. This action uncovers the first fluid from the surface of the hydrophobic layer 13 of the electrowetting element. When the voltage across the element is returned to an in-active voltage of zero or a value near to zero, the first fluid flows back to cover the hydrophobic layer 13. In this way the first fluid forms an electrically controllable optical switch in each electrowetting element.

Figure 2:
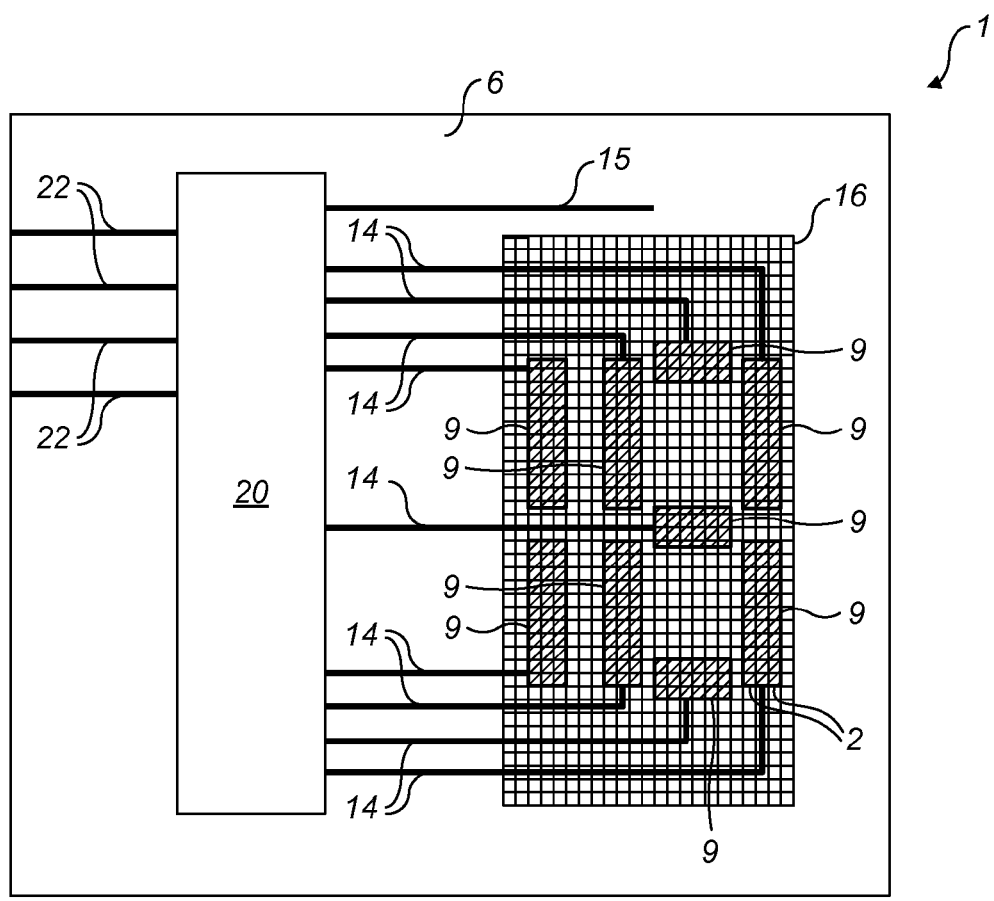
FIG. 2 shows a diagrammatic planar view of a part of an embodiment of electro-optic display apparatus according to the invention.

FIG. 2 shows a diagrammatic planar view of an embodiment of an electrowetting display apparatus 1 according to the invention.

The electrowetting display device is in this embodiment a segmented display device in the form of a numeric display which is defined by a number of different segments. The segments can be selectively actuated in order to display a number from 0 to 19. The segments are defined by 9 separate segment electrodes 9 formed on the system plate 6. Each segment electrode is indicated by cross-hatchings in FIG. 2. The display apparatus also includes a raster grid of electrowetting element walls 16 forming square electrowetting elements which cover at least the area of the segment electrodes 9 (only some of the electrowetting elements 2 are labelled in FIG. 2 for clarity). Those electrowetting elements which are outside the segment electrodes 9 are non-operable.

The driving circuitry of the display apparatus 1 includes a display driving system 20 in the form of an integrated circuit adhered to the support plate 6. The display driving system 20 includes control logic and switching logic, and is connected to the display by means of segment signal lines 14 and a common signal line 15. Each segment electrode signal line 14 connects an output from the display driving system 20 to a different segment electrode 9, respectively. Also included are one or more data input lines 22, whereby the display driving system can be instructed with data so as to determine which segments should be in an active state and which segments should be in a non-active state at any moment of time.

By selectively actuating certain of the segment electrodes with an active voltage signal, the electrowetting elements which overlap with the selected segment electrodes are driven to an open state, in which the first fluid 12 is removed from the surface of the support plate 6, whilst other non-selected electrodes are driven with a non-active voltage signal which is equal to, or at least substantially equal to, the common voltage signal applied to the common signal line 15.

In this embodiment of the invention, the input of reset pulses is decoupled from the input of data signals. Considering first the mechanism used to reset electrowetting elements in the segments which are driven with an active voltage signal (via segment signal line 14), these segments receive an intermittent reset signal consisting of a short pulse comprising a reset voltage having a second signal level, which is substantially equal to zero, for a short period of time. The reset pulses are applied intermittently, preferably at a regular interval.

Figure 3:
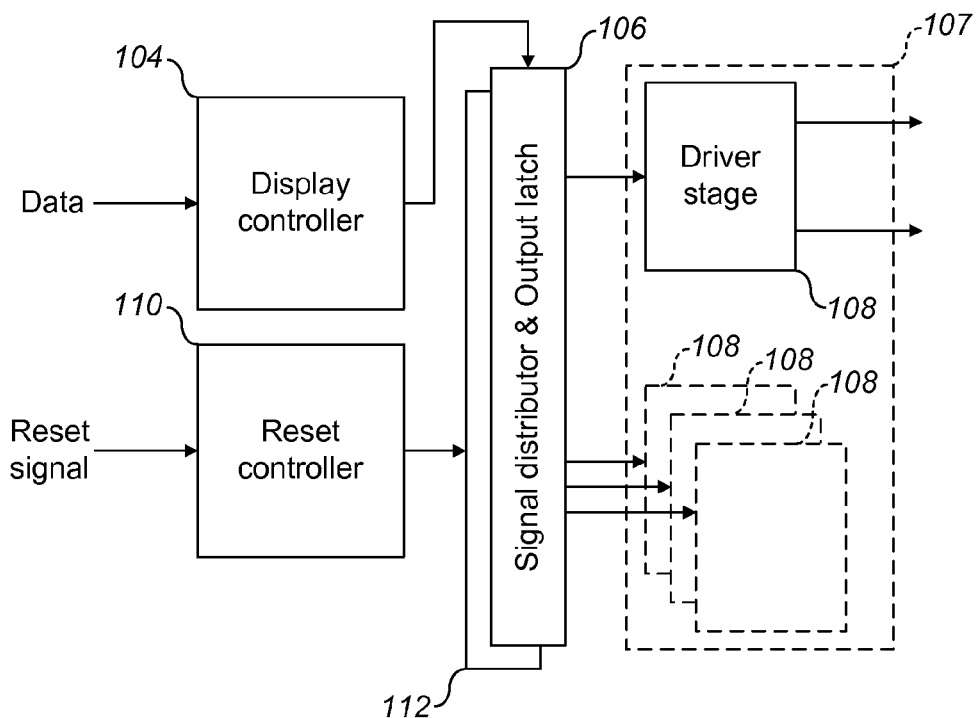
FIG. 3 shows a display driving system according to an embodiment of the invention.

FIG. 3 shows circuitry within the display driving system 20 for applying these reset pulses. The embodiment of the circuitry shown may comprise a display controller 104 receiving data on its data input relating to the image to be displayed from a microcontroller, possibly via a data interface. The data output of the display controller is connected to a data input of a signal distributor, which in turn is connected to a data output latch 106. When the display driving system does not comprise a display controller, the data input of the display driving system is connected directly to the input of the distributor. The signal distributor distributes incoming data input over a plurality of distributor outputs connected to the display, preferably via driver stages. The signal distributor causes data input indicating that a certain image region is to be set in a specific display state to be sent to the output connected to this image region. The distributor may be a shift register. The input data for the distributor is clocked into the shift register and at receipt of a latch pulse the content of the shift register is copied to the output latch. The output latch has a plurality of outputs, connected to a driver assembly 107. The data copied to the output latch is presented at the outputs of the latch from the time of said latch pulse till the next latch pulse. The outputs of the latch are connected to the inputs of a plurality of driver stages 108 within the driver assembly.

Figure 5A:
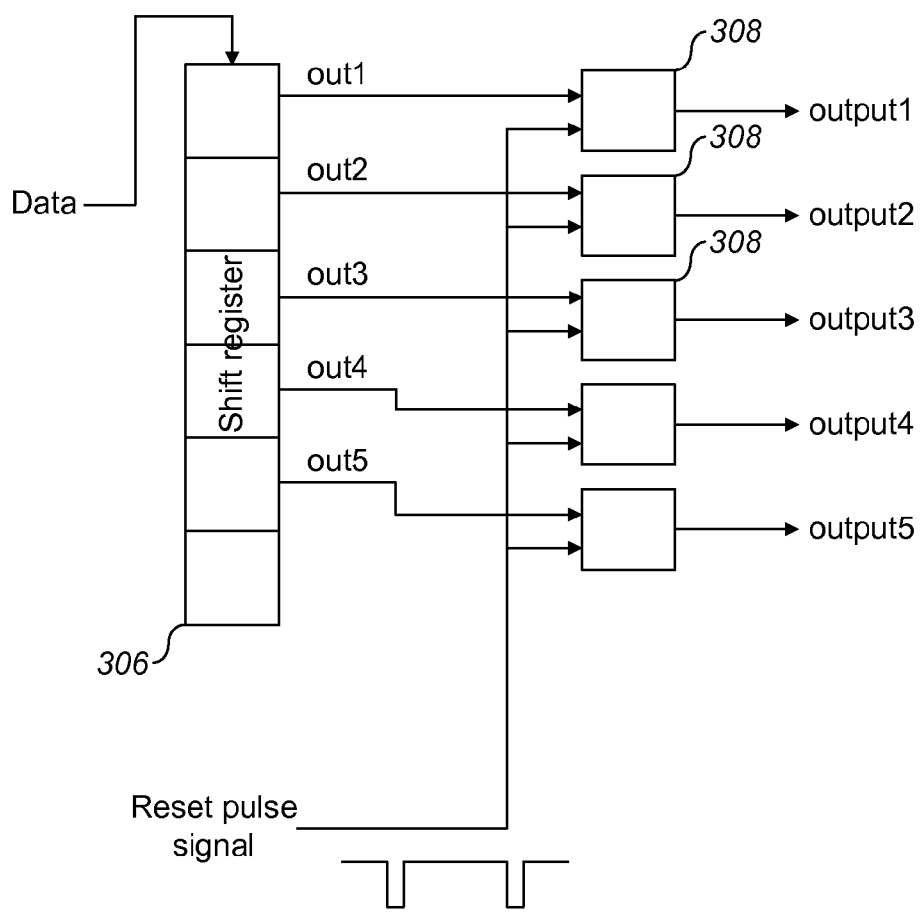
FIG. 5A shows driver circuitry which may be used in each of the embodiments shown in FIGS. 3 and 4.
Figure 5B:
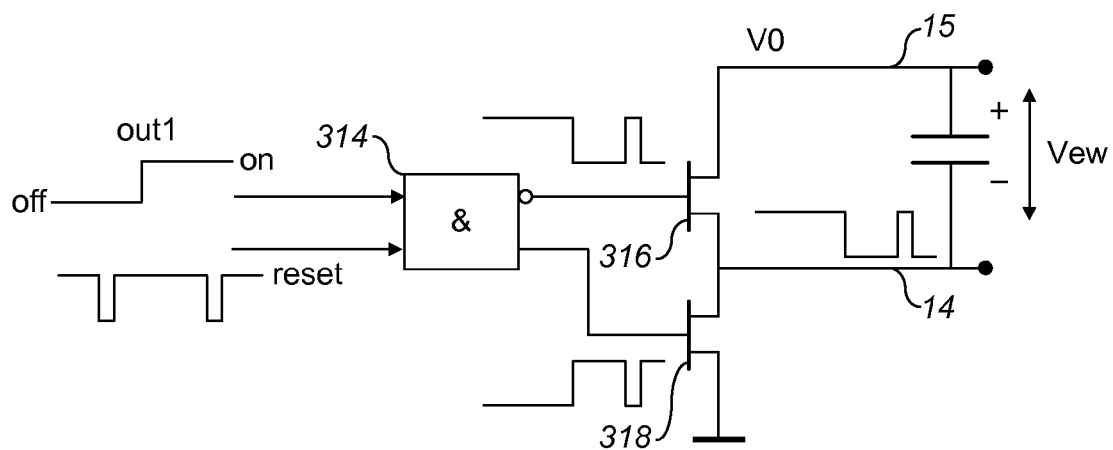
FIG. 5B shows a driver stage which may be used in each of the embodiments shown in FIGS. 3 and 4.

In addition, the circuitry comprises a separate reset controller 110. The reset controller 110 can receive a reset signal from the microcontroller, independent of and separate of the data input on the data interface, preferably synchronized with the data. The reset controller 110 applies this signal to a second distributor 112, which distributes the reset signal over a plurality of second distributor outputs connected to each of the driver stages 108 or to each of a group of driver stages 108. In response to the reset signal, a driver stage outputting a voltage of the first level will output a reset pulse, which is then applied to the segment via the segment signal line 14. After the application of the reset pulse, the output of the driver stage returns to the voltage of the first level without requiring the receipt of additional data signals from the microcontroller controlling the electro-optic display. Instead, using for example an arrangement as shown in FIGS. 5A and 5B, once the reset pulse is completed, the original data settings are maintained. This therefore avoids the need for the reading of data into the distributor every time a reset pulse is applied and the data in the output latch 106 need not be varied. This enables a lower data rate to be used for the reading of data into the controller circuitry.

It should be noted that the reset pulses are applied only in the case of the electrowetting elements which are selected to be in an active state, namely those electrowetting elements which are currently open and being driven by an active voltage. The remaining driver stages, which are in an off state and provide a non-active voltage, are unaffected by the reset pulse, as they do not require resetting.

Figure 4:
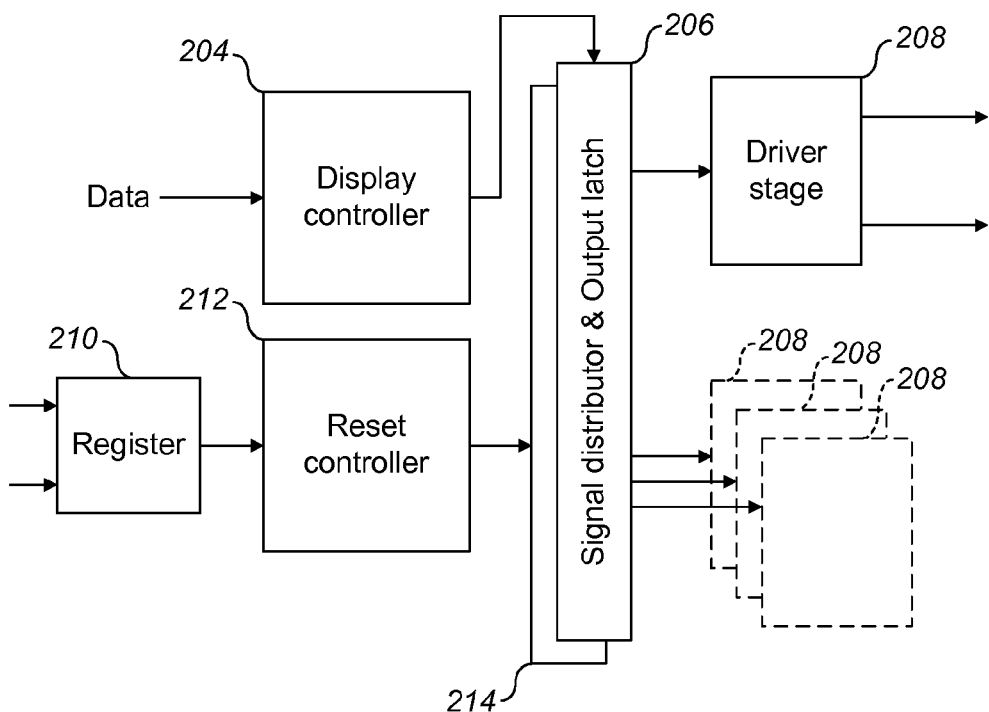
FIG. 4 shows a display driving system according to another embodiment of the invention.

FIG. 4 illustrates an alternative embodiment of the invention, wherein the reset pulses are generated autonomously within the driver circuitry, rather than being received from a microcontroller. In this case, the apparatus includes a register 210, a reset pulse generator controller 212 and a reset signal distributor 214 in addition to a display controller 204, a distributor and output latch 206 and driver stages 208. In this case, rather than receiving a specific reset pulse waveform from the microcontroller, the microcontroller only needs to place occasionally reset settings within the register 210. Alternatively, the settings may be held permanently in the register, and do not need resetting. These register settings are read as a signal separate from the data input by the reset wave generator controller 212 or waveform generator, which then generates an appropriate reset pulse waveform. The settings may be used to define the signal waveform of the reset pulses, such as width, their frequency, etc. The reset pulses are subsequently distributed to the driver stages 208 by the reset signal distributor 214 and then applied by the driver stages to selected ones of the segments of the display.

FIG. 5A shows a driver circuitry arrangement which may be used in each of the embodiments shown in FIGS. 3 and 4. The arrangement includes a distributor and output latch 306, in the form of a shift register, receiving data from a microcontroller via a data interface, and individual driver stages 308 for each segment of the display device. A reset pulse signal is received from a reset signal distributor.

FIG. 5B shows one of the driver stages 308. The driver stage receives two inputs, one from the output latch 306 and another from the reset signal distributor. The two signals received are then input into a push-pull stage which includes an AND gate 314 and two transistors 316 and 318. The push-pull stage has an output in the form of two signal lines 14 and 15. The effect of the push-pull stage is that, when an electrowetting element is switched to a non-active state, a reset pulse is not applied in the voltage Vew applied across the electrowetting element, since the voltage level of the reset pulse is equal to that of the electrowetting element non-active state. On the other hand, when an electrowetting element is in an active state, the reset pulses which are received from the reset controller are applied intermittently in the voltage Vew applied across the electrowetting element, and the voltage Vew is automatically returned to the main driving voltage across the element after a reset pulse has ended. FIG. 5B illustrates a driver stage which may be used to introduce the reset pulses into the actuating signals which are generated from the data signals received on the data interface. The signal line 15 may be connected to ground, making the signal line 14 negative when applying the first voltage.

Figure 6:
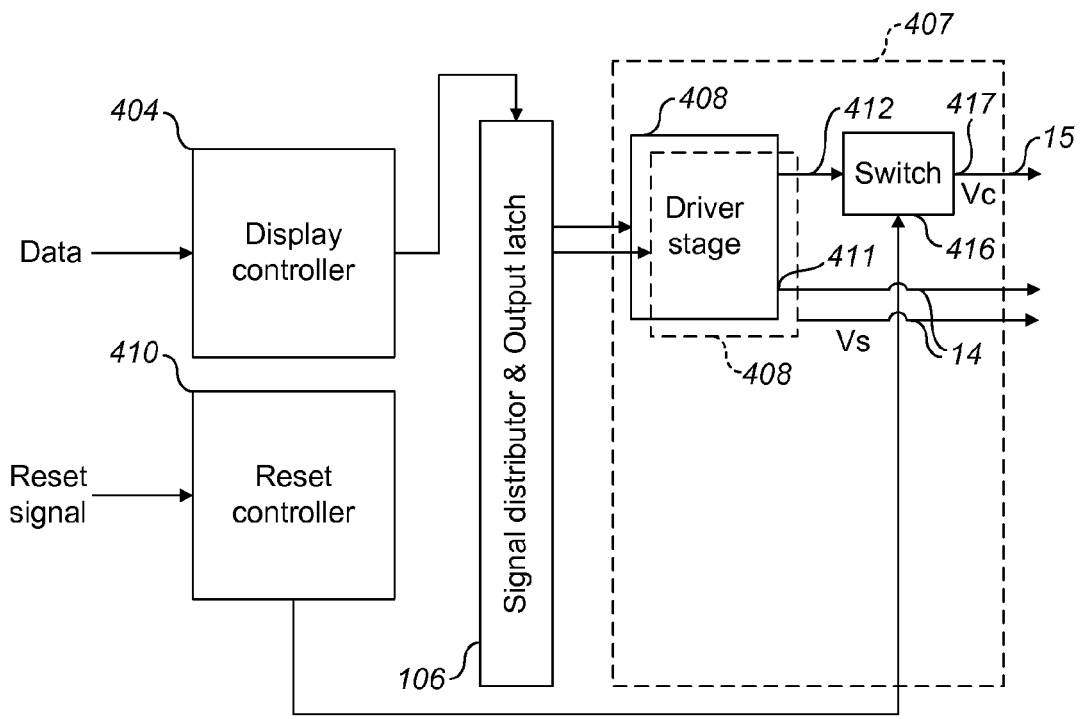
FIG. 6 shows a driver circuitry arrangement according to another embodiment of the invention.

FIG. 6 shows an alternative embodiment of the driver stage for the display device according to the invention. The driver stage includes a display controller 404, a signal distribution and output latch 406, a driver assembly 407 including a plurality of driver stages 408, two of which are shown, and a reset controller 410, all operating in a similar way as the corresponding elements in FIG. 3. Each driver stage has an output comprising two terminals 412 and 414 between which the active or non-active voltage signal is output. The terminal 412 is a common terminal providing a voltage Vc for the plurality of driver stages. The terminal 412 is connected to the electrode in contact with the second fluid via the second signal line 15. The terminal 414 of each driver stage provides a signal Vs depending on the state of the output latch and is connected to a segment of the display via a first signal line 14. The voltage Vew between terminals 412 and 414 is applied to the segment. The driver assembly 407 includes a switch 416. The switch is arranged between the output 412 of the driver stage and the signal line 15. The switch receives at its input the common signal 412 of the driver stage as determined by the output latch. The operation of the switch is controlled by the reset signal from the reset controller 410. When no reset pulse is received from the reset controller 110, the switch 416 connects the output 412 of the driver stage to the switch output terminal 417. During receipt of a reset pulse, the switch connects the terminal 412 to a voltage source or to ground.

Figure 7:
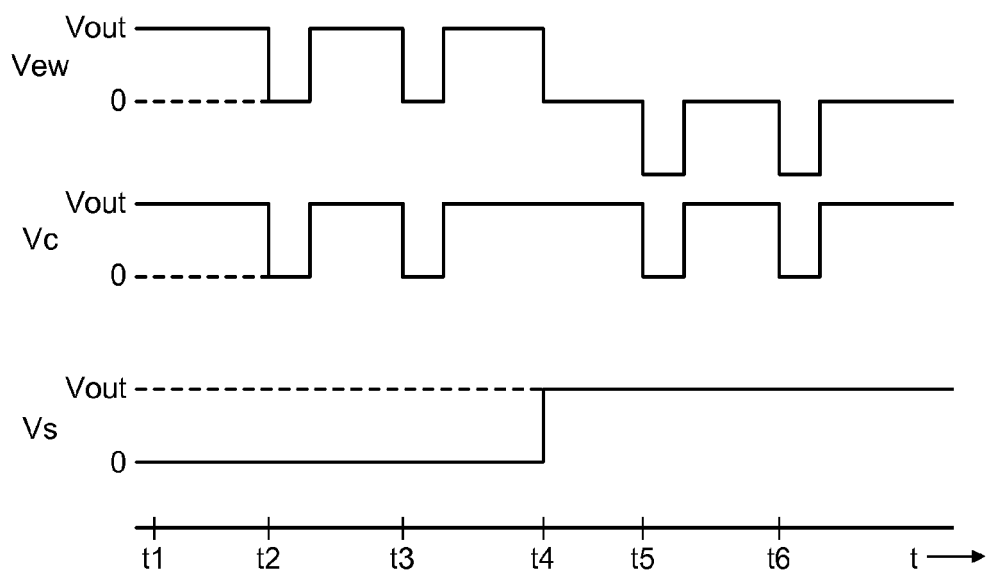
FIG. 7 shows pulse waveforms of the driver stage shown in FIG. 6.

FIG. 7 shows an example of pulse waveforms for Vew, Vc and Vs of the driver stage shown in FIG. 6. At time t1 Vs at terminal 414 is zero volts and the Vc at output 417 is Vout, in this embodiment 28 volt. The voltage applied to the segment Vew is Vc minus Vs. At time t1 Vew is equal to Vout. This active voltage signal having the first signal level will set the segment in the active display state. At time t2 the switch 416 receives a reset pulse and lowers Vc to zero volts for a duration of 1 ms. Vew now becomes zero volts, an active voltage signal of the second signal level. After the reset pulse Vc returns to Vout and therefore Vew returns to Vout. The reset pulse is sufficiently short not to affect the active display state of the segment. At time t3 a subsequent reset pulse is applied. At time t4 the output latch changes state and Vs changes to Vout. Consequently, Vew becomes zero, setting the segment in the non-active state. The reset pulses at times t5 and t6 cause negative pulses in Vew as shown in FIG. 7. The negative pulses can be made sufficiently short not to cause a visible effect in the optical state of the non-active elements. Alternatively a single-polarity element, such as a diode, can be arranged before the segment, allowing only a single polarity on the segment.

The low voltage of Vc in the example of FIG. 7 is indicated as zero volts but may also be another voltage, low compared to Vout. The driver stage may be a tri-state device in which Vs is switched between Vout and Vd, a voltage of for example 3 volts. To avoid polarity reversal of Vew in the active state, Vc can be switched between Vout and Vd.

Although the embodiment uses a terminal in common for a plurality of driver stages, the switching of Vc may also be applied to driver stages that do not have a terminal in common. In that case each driver stage or group of driver stages must have its own switch 416.

The reset controller 410 may be replaced by a register 210 and reset pulse generator controller 212 as shown in FIG. 4.

Figure 8:
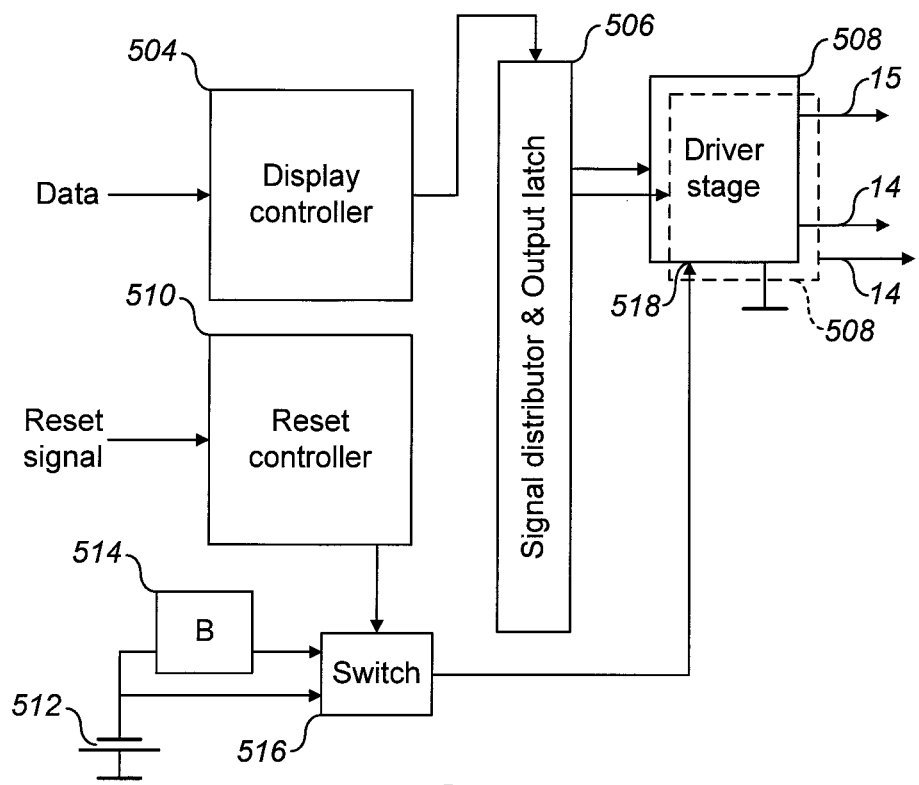
FIG. 8 shows a driver circuitry arrangement according to another embodiment of the invention.
Figure 9:
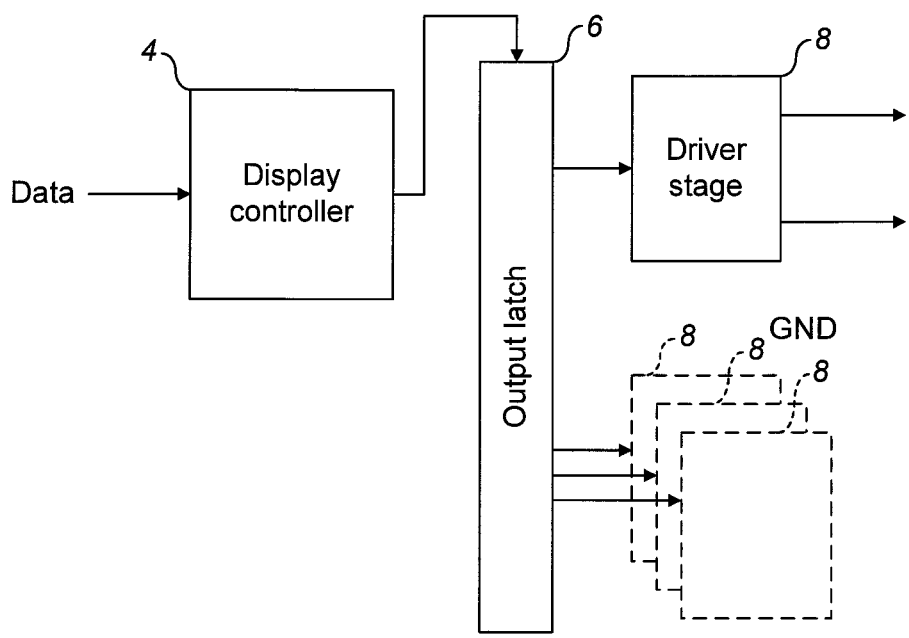
FIG. 9 shows a driver circuitry arrangement according to the prior art.
Figure 10:
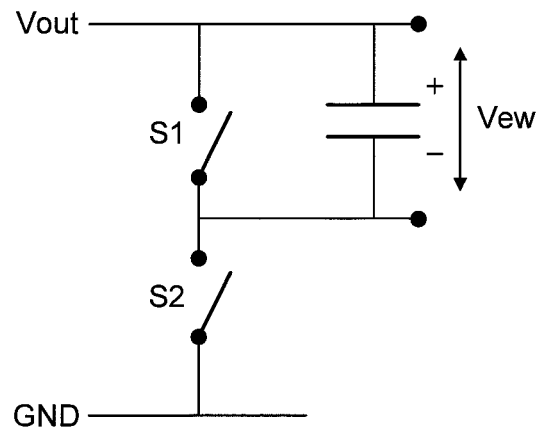
FIG. 10 shows a driver stage according to the prior art.
Figure 11:
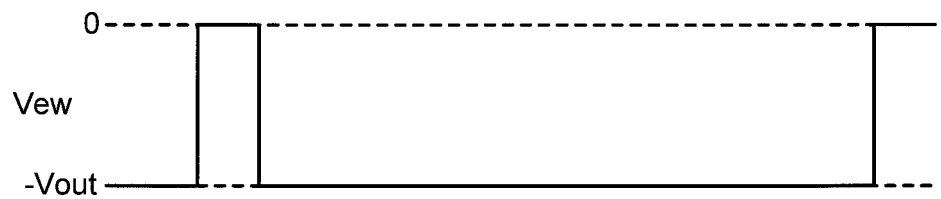
FIG. 11 shows a reset pulse signal waveform.
Figure 12:
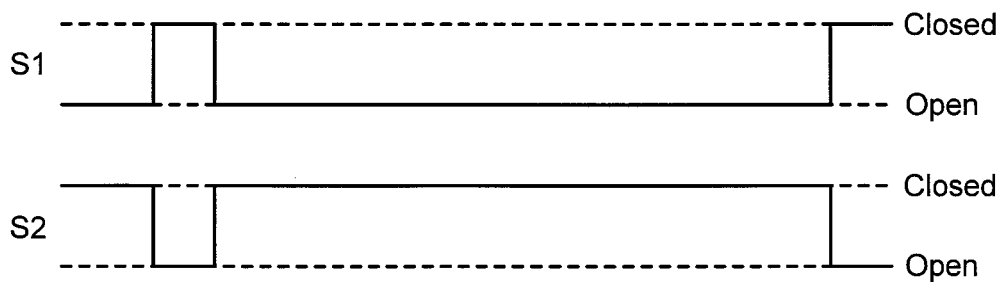
FIG. 12 shows a switching scheme for the driver stage shown in FIG. 10.

FIG. 8 shows a further embodiment of the display driving system for the display device according to the invention. The display driving system includes a display controller 504, a signal distribution and output latch 506, a driver assembly comprising a plurality of driver stages 508, two of which are shown and a reset controller 510, all operating in a similar way as the corresponding elements in FIG. 3. The driver assembly comprises a power supply 512, a booster 514 and a switch 516. The power supply delivers a voltage Vd for powering logic circuitry, e.g. 3 volts. The booster 514 increases the voltage to Vout, e.g. 28 volts. The switch 516 has two inputs to which the voltages Vd and Vout are applied. The output of the switch is connected to a power supply input 518 of a driver stage 508. A plurality of driver stages may have a common power supply input to which the output of the switch is connected.

The switch 516 is controlled by the reset signal from the reset controller 510. When no reset pulse is received from the reset controller 110, the switch 516 connects the voltage Vout to the power supply input 518. During receipt of a reset pulse, the switch connects the voltage Vd to the power supply input 518. When no reset pulse is received, the driver stage operates in the usual way and delivers a voltage to the segment depending on the state of the output latch. When a reset pulse is received the voltage of both signal lines 14 and 15 drop to Vd and the voltage Vew becomes zero during the reset pulse. Alternatively, the switch 516 may switch the voltage at the power supply input 518 between Vout and zero volts.

When the output latch 506 is integrated with the driver stages 508 and they have a common power supply input 518, it is advantageous to switch the voltage of the power between Vout and Vd, thereby allowing the latch to maintain its state. The integration may include the distributor.

International patent application WO 2003/071346 discloses measures that allow the first fluid to cover the area of the electrowetting element only partially, thereby realizing so-called grey values. Such a scheme may also be used in embodiments of the present invention of the display apparatus. The grey values may for example be obtained by applying a pulse-width modulated voltage signal to each of the electrowetting elements which are selected to be in a common grey value display state or by so-called amplitude modulation.

The above embodiments are to be understood as illustrative examples of the invention. Further embodiments of the invention are envisaged.

For example, whilst in the above embodiments the display device is a segmented display device, in which the segments form the individually addressable image regions, the display may alternatively be composed of pixels, possibly in the form of a matrix, in which the pixels form the individually addressable image regions.

Furthermore, whilst in the above embodiments the electro-optic display device is an electrowetting display device, other display device types are envisaged which may also benefit from the invention.

Note that, whilst in the above embodiments the reset pulse is applied at a voltage which is substantially zero, other reset voltages may be applied. For example, a reset voltage may be applied which is opposite in polarity to the normal actuating voltage.

A method is disclosed of operating an electro-optic display apparatus, the display apparatus including a display device having image regions and a display driving system, the driving system having a distributor for providing signals for driving the image regions, and a data input for selecting image regions connected to the input of the distributor, each image region having an active display state in which the image region is driven with an active voltage signal, wherein the active voltage signal includes a first signal level which sets an image region to the active display state and a second signal level different from said first signal level and which is applied for a shorter duration than said first signal level. The method includes:
applying said first signal level to one of said image regions in response to receiving data on said data input indicating that said image region is to be set to the active display state,
applying the second signal level to said image region after said first signal level has been applied; and
reapplying said first signal level before receipt of further data for said image region on said data input.

Also disclosed is the above method in which said first signal level substantially different to zero, and wherein said second signal level is substantially equal to zero.

Also disclosed is the above method including applying a different voltage signal to a different image region, said different voltage signal being maintained at a substantially constant level whilst said active voltage signal is varied between said first signal level and said second signal level.

Also disclosed is the above method wherein said display driving system includes an output latch for latching data received via said data input, and wherein said second signal level is applied to a given image region without varying data held in said output latch for said image region.

Also disclosed is the above method wherein a plurality of image regions have a common signal line, the method comprising changing the voltage on the common signal line, thereby changing the active voltage signal of the image region from the first signal level to the second signal level and back to the first signal level.

Also disclosed is the above method wherein the display driving system includes a driver stage for each image region and one or more driver stages have a power supply input, the method including changing a voltage of a power applied to the power supply input in response to a reset signal, thereby changing the active voltage signal of the one or more driver stages from the first signal level to the second signal level and back to the first signal level. In a more particular aspect, the display driving system includes a latch for latching data received via said data input, and one or more driver stages and the latch have a common power supply input, the method comprising reducing the voltage of the power to a minimum voltage for operation of the latch in response to the reset signal.

Also disclosed is the above method including receiving a separate signal from an input separate from said data input, said separate signal defining one or more characteristics relating to the application of the second signal level. In a more particular aspect, said separate signal has a signal waveform which corresponds with a waveform with which said second signal is applied. In another more particular aspect, said separate signal is in the form of data which defines one or more characteristics of a waveform with which said second signal is applied. In a further particular aspect, said separate signal is in the form of data which defines one or more characteristics of a waveform with which said separate signal is applied, wherein said waveform generator is responsive to said separate signal.

Also disclosed is the above method wherein said display driving system includes a waveform generator, and the method comprises generating a waveform with which said second signal is applied using said waveform generator. In a more particular aspect, said display driving system includes a data register, and wherein said waveform generator is responsive to said data register.

Also disclosed is the above method wherein said display driving system includes a plurality of driver stages, each said driver stage being responsive to a first input signal defining said active voltage signal and a second input signal defining a signal which is used to apply a voltage at said second signal level.

Also disclosed is the above method wherein said second signal level is applied in the form of a pulse waveform. In a more particular aspect, said pulse waveform has a duration of less than 10 milliseconds or less than or equal to 1 millisecond.

Also disclosed is the above method wherein said display device is a segmented display in which each of said image regions corresponds with a different segment of the display, wherein said method comprises applying the active voltage signal to a segment during the interval between the first and the second consecutive data items corresponding to said segment.

Also disclosed is the above method wherein said display device is an electrowetting display device. In a more particular aspect, an image region comprises at least one first fluid and a second fluid immiscible with each other and at least one surface area, the method including applying voltages to the image region associated with a non-active display state and an active display state, in said non-active display state said first fluid tends to cover said at least one surface area, and in said active display state said second fluid tends to cover said at least one surface area.

Also disclosed is a display driving system for an electro-optic display device having image regions, each image region having an active display state in which the image region is driven with an active voltage signal, adapted to perform the above method.

Also disclosed is a display driving system for an electro-optic display device having image regions, each image region having an active display state in which the image region is driven with an active voltage signal, including a data input for selecting image regions. The display driving system includes:
  a distributor having an input connected to the data input and having one or more distributor outputs;
  a driving assembly including one or more driver stages, each driver stage having an input connected to one of the distributor outputs and a driver stage output connected to one of said image regions for providing an active voltage signal, the active voltage signal including a first signal level for setting the image region to an active display state and a second signal level different from said first signal level and which is applied for shorter durations than said first signal level; and
  a reset controller having an output providing a reset signal and connected to the driving assembly for providing in response to the reset signal at the one or more driver stage outputs the second signal level of the active voltage signal.

Also disclosed is the above display driving system including a second distributor having an input connected to the output of the reset controller and one or more second distributor outputs, each driver stage having a second input connected to one of the second distributor outputs.

Also disclosed is the above display driving system wherein each driver stage includes an AND gate connected to one of the distributor outputs and either one of the second distributor outputs or the output of the reset controller.

Also disclosed is the above display driving system including a plurality of driver stages and each driver stage output comprising two terminals, wherein a plurality of driver stages have one of the terminals in common, the plurality of driver stages being arranged to change the voltage of the terminal in common in response to the reset signal, thereby changing the active voltage signal of each driver stage from the first signal level to the second signal level and back to the first signal level.

Also disclosed is the above display driving system wherein each driver stage has a second input connected to the output of the reset controller.

Also disclosed is the above display driving system wherein one or more driver stages have a power supply input and the driver stage is arranged to change a voltage of a power applied to the power supply input in response to the reset signal, thereby changing the active voltage signal of the one or more driver stages from the first signal level to the second signal level and back to the first signal level. In a more particular aspect, the display driving system includes a latch connected to the outputs of the distributor for latching data received via said data input, wherein one or more driver stages and the latch have a common power supply input and the one or more driver stages are arranged to reduce in response to the reset signal the voltage of the power to a minimum voltage for operation of the latch.

Also disclosed is an electro-optic display apparatus including the above display driving system and a display device.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of operating an electro-optic display apparatus, the display apparatus including a display device having image regions and a display driving system connected to the image regions by signal lines, the display driving system having a distributor for providing signals for driving the image regions via the signal lines, and the display driving system having a data input for selecting image regions, which data input is connected to an input of the distributor, each image region having an active display state in which the image region is driven with an active voltage signal, wherein the active voltage signal includes a first signal level which sets an image region to the active display state and a second signal level different from said first signal level and which is applied for a shorter duration than said first signal level, the method comprising:
  applying said first signal level to one of said image regions in response to receiving data on said data input of the display driving system, the data indicating that said one of said image regions is to be set to the active display state,
  applying the second signal level to said one of the image regions after said first signal level has been applied; and
  reapplying said first signal level to said one of the image regions, on the basis of said data which was received on the data input of the display driving system before applying the second signal level to said one of the image regions, and before receipt on said data input of the display driving system of further data indicating a further signal level to be applied to said one of the image regions.

2. A method according to claim 1, wherein said first signal level is substantially different to zero, and wherein said second signal level is substantially equal to zero.

3. A method according to claim 1, comprising applying a different voltage signal to a different image region, said different voltage signal being maintained at a substantially constant level whilst said active voltage signal is varied between said first signal level and said second signal level.

4. A method according to claim 1, wherein said display driving system includes an output latch for latching data received via said data input of the display driving system, and wherein said second signal level is applied to a given image region without varying data held in said output latch for said image region.

5. A method according to claim 1, wherein a plurality of image regions have a common signal line, the method comprising changing the voltage on the common signal line, thereby changing the active voltage signal of the image region from the first signal level to the second signal level and back to the first signal level.

6. A method according to claim 1, wherein the display driving system includes a driver stage for each image region and one or more driver stages have a power supply input, the method including changing a voltage of a power applied to the power supply input in response to a reset signal, thereby changing the active voltage signal of the one or more driver stages from the first signal level to the second signal level and back to the first signal level.

7. A method according to claim 1, comprising receiving a separate signal from an input separate from said data input of the display driving system, said separate signal defining one or more characteristics relating to the application of the second signal level.

8. A method according to claim 7, wherein said separate signal has a signal waveform which corresponds with a waveform with which said second signal is applied.

9. A method according to claim 7, wherein said separate signal is in the form of data which defines one or more characteristics of a waveform with which said second signal is applied.

10. A method according to claim 1, wherein said display driving system includes a waveform generator, and the method comprises generating a waveform with which said second signal is applied using said waveform generator.

11. A method according to claim 1, wherein said display driving system includes a plurality of driver stages, each said driver stage being responsive to a first input signal defining said active voltage signal and a second input signal defining a signal which is used to apply a voltage at said second signal level.

12. A method according to claim 1, wherein said second signal level is applied in the form of a pulse waveform.

13. A method according to claim 1, wherein said display device is a segmented display in which each of said image regions corresponds with a different segment of the display, wherein said method comprises applying the active voltage signal to a segment during the interval between the first and the second consecutive data items corresponding to said segment.

14. A method according to claim 1, wherein said display device is an electrowetting display device.

15. A display driving system for an electro-optic display device having image regions, each image region having an active display state in which the image region is driven with an active voltage signal, adapted to perform the method of claim 1.

16. A method according to claim 1, including distributing the applied second signal level to different of the image regions over time.

17. A method according to claim 1, wherein the display device comprises groups of one or more image regions, each group having a common signal line, the method comprising changing of an applied voltage on the common signal lines, thereby changing the active voltage signal of the image regions of the group from the first signal level to the second signal level and back to the first signal level, the changing of the applied voltage being distributed to different of the common signal lines over time.

18. A method according to claim 1, wherein one or more of the image regions includes one or more electrowetting elements.

19. A display driving system for an electro-optic display device having image regions, each image region having an active display state in which the image region is driven with an active voltage signal, the display driving system including a data input for selecting image regions; the display driving system including a distributor having an input connected to the data input and having one or more distributor outputs;

a driving assembly including one or more driver stages, each driver stage having an input connected to one of the distributor outputs and a driver stage output connected to one of said image regions for providing an active voltage signal, the active voltage signal including a first signal level for setting the image region to an active display state and a second signal level different from said first signal level and which is applied for shorter durations than said first signal level; and a reset controller having an output for providing a reset signal and connected to the driving assembly for providing in response to the reset signal at the one or more driver stage outputs the second signal level of the active voltage signal.

20. A display driving system according to claim 19, including a second distributor having an input connected to the output of the reset controller and one or more second distributor outputs, each driver stage having a second input connected to one of the second distributor outputs.

21. A display driving system according to claim 19, wherein each driver stage has a second input connected to the output of the reset controller.

22. A display driving system according to claim 19, wherein one or more driver stages have a power supply input and the driver stage is arranged to change a voltage of a power applied to the power supply input in response to the reset signal, thereby changing the active voltage signal of the one or more driver stages from the first signal level to the second signal level and back to the first signal level.

23. An electro-optic display apparatus including a display driving system according to claim 19 and a display device.

24. A display driving system according to claim 19, wherein one or more of the image regions includes one or more electrowetting elements.

* * * * *